Figure 3:
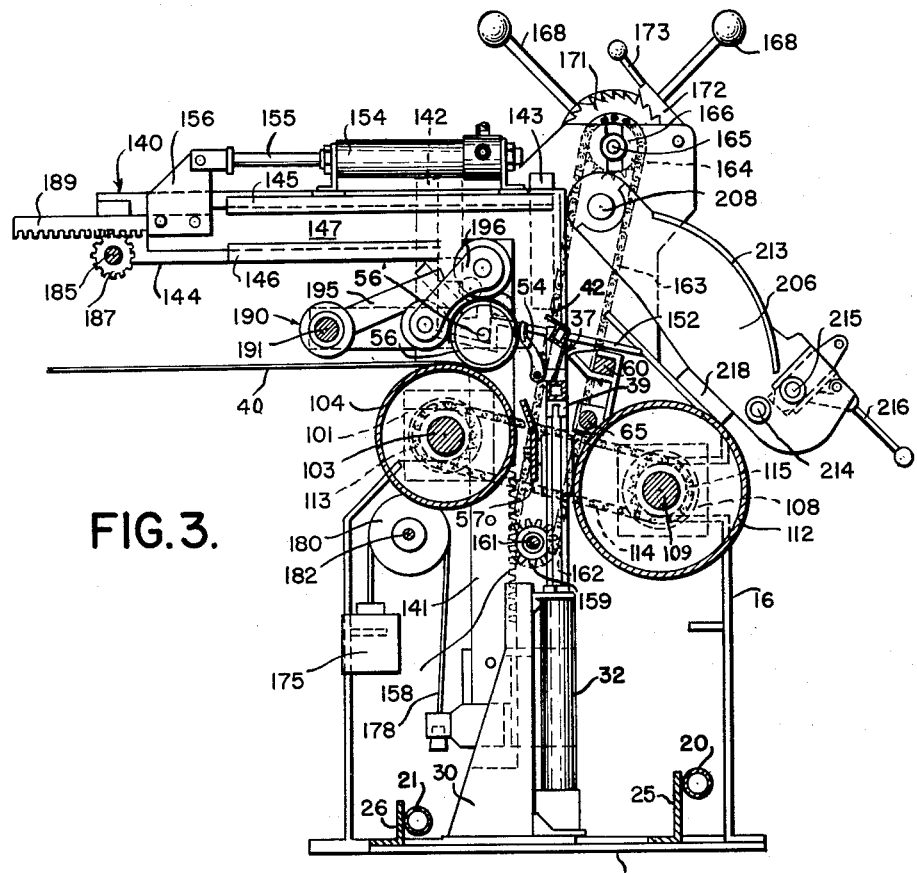

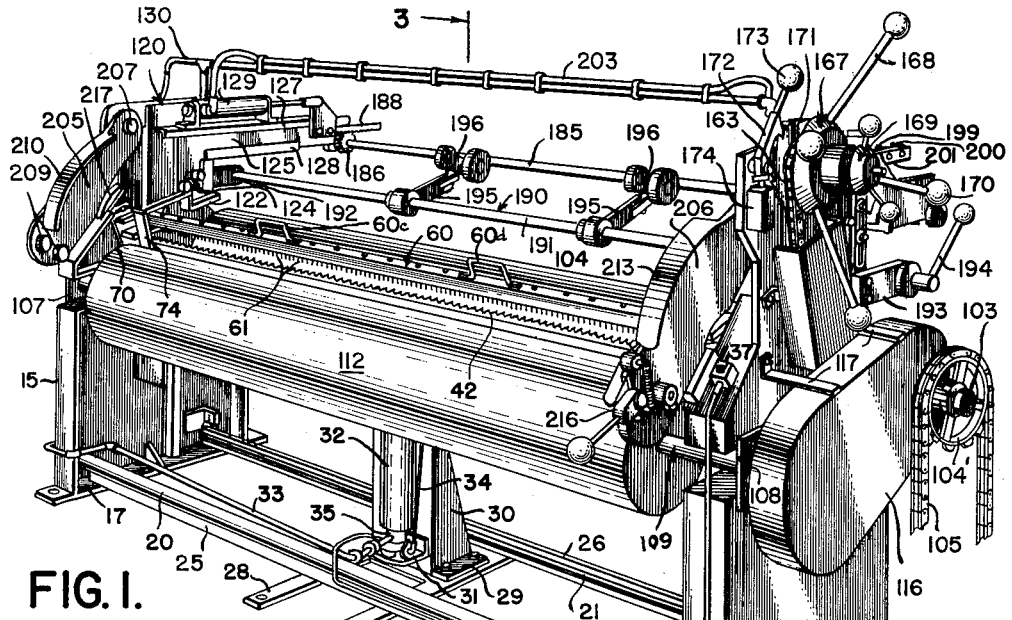
Nov. 21, 1961 W. P. ROSE ET AL 3,009,376
HOLD DOWN PIN BAR ASSEMBLY FOR CONTINUOUS BATCHER
Filed Dec. 12, 1958 3 Sheets-Sheet 1
INVENTORS
Werner P. Rose
Alfred R. Gessinger &
Robert E. Kuhn
BY L. S. Saulsbury
ATTORNEY

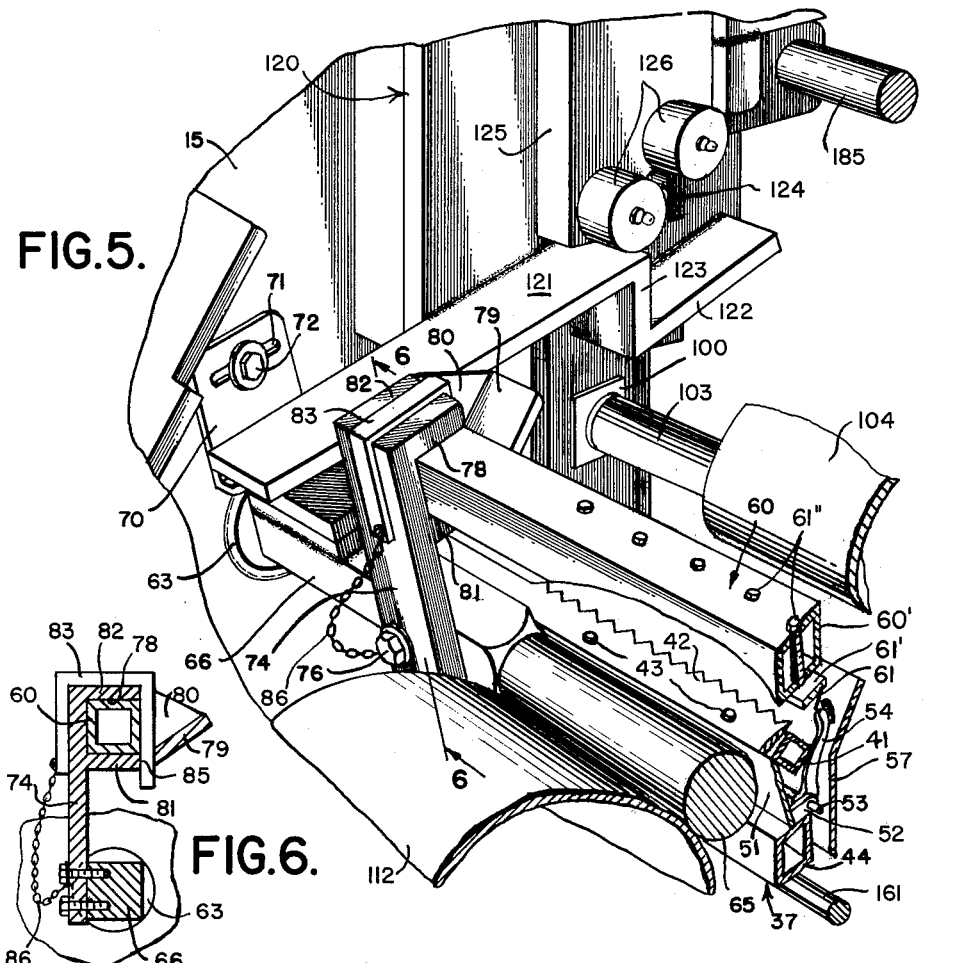
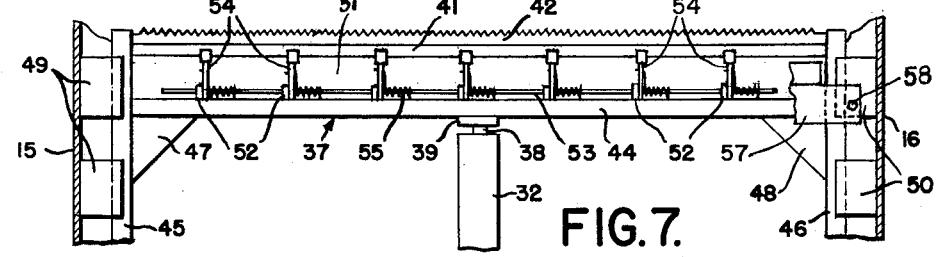
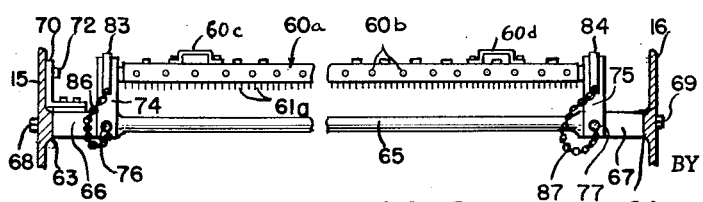

United States Patent Office 3,009,376
Patented Nov. 21, 1961

3,009,376
HOLD DOWN PIN BAR ASSEMBLY FOR CONTINUOUS BATCHER
Werner P. Rose, Oakland, Alfred R. Gessinger, Ridgewood, and Robert E. Kuhn, Saddle River, N.J. (all of 183 Autumn St., Passaic, N.J.)
Filed Dec. 12, 1958, Ser. No. 779,897
6 Claims. (Cl. 83—381)

This invention relates to a continuous batcher for textiles, plastic or paper sheet material and more particularly to a hold down pin bar therefor.

It is the principal object of this invention to provide a hold down pin bar for a continuous batcher for textiles, plastic or paper which prevents the tenting of the material while being cut so that the cutting effected by the cutting bar assembly may be made clean without difficulty or delay.

It is another object of the present invention to provide a hold down pin bar for a continuous batcher that permits and makes possible the use of an effective straight knife blade assembly and eliminates, yet providing a good cutting operation, the rotary driven knives in which threads become entangled and which is always in need of constant cleaning and disassembly in order to effect cleaning.

It is still another object of the invention to provide a cutter bar assembly for a continuous batcher which can be effectively used for cutting heavy and particularly coated sheet materials which have heretofore given great difficulty in the cutting of the same and which were practically impossible to be cut with the existing cutting assemblies for these batchers.

It is a further object of the invention to provide a straight cutting knife assembly for batchers with a removable hold down bar that is applied immediately adjacent the straight cutter knife to hold the cloth and prevent tenting of the same even in the absence of back tension on the cloth from the machine which the batcher is serving in which the pins on the hold down bar that serve to hold the cloth as it is cut are angled to readily release the cloth therefrom and to release the roll and in which the holder for the hold down pin bar can be angularly adjusted fore and aft to alter the angle of the holding pins depending upon the thickness and nature of the cloth, plastic or paper, being handled and to permit the easy pulling of the cut end of the roll therefrom.

Other objects of the invention are to provide a hold down pin bar assembly for use with the cutting knife assemblies of batchers, having the above objects in mind, which is of simple construction, inexpensive to manufacture, has a minimum number of parts, easy to use, lift and replace upon its supports, easy to adjust for the different types of material, easy to clean and maintain, the hold down bar being light in weight, durable, rigid, stiff, effective and efficient in use.

For other objects and for a better understanding of the invention, reference may be had to the following detailed description, taken in connection with the drawing, in which—

Figure 4:
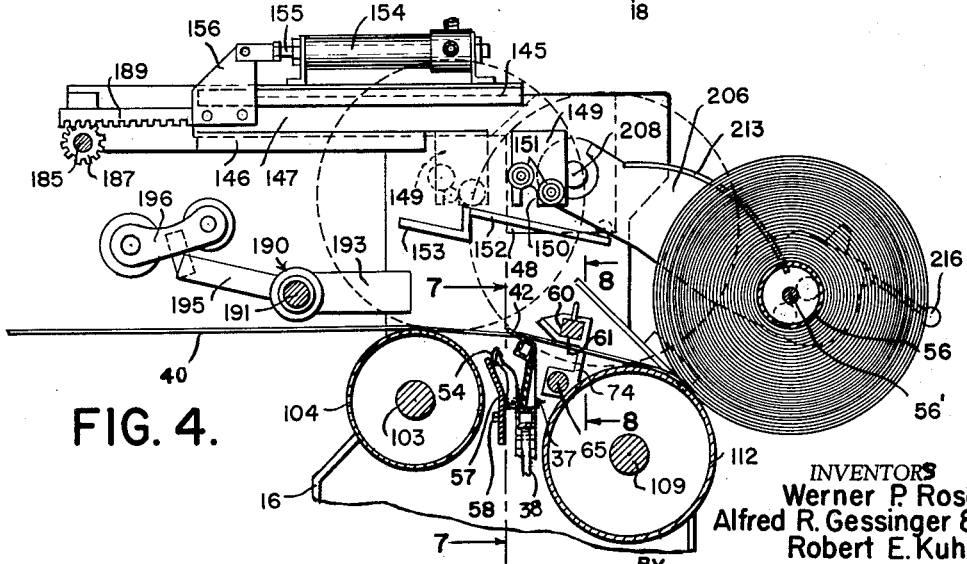

FIGURE 1 is a front perspective view of the continuous batcher with the hold down pin bar in place thereon, FIG. 2 is a rear perspective view of the batcher and of the hold down pin bar, FIG. 3 is a vertical sectional view of the batcher with a new roll being started, the view being taken on line 3—3 of FIG. 1, FIG. 4 is a similar fragmentary sectional view illustrating the manner in which the batched roll is transferred to a position where it is being severed, FIG. 5 is an enlarged fragmentary perspective view of the batcher showing one end of the hold down pin bar in place, FIG. 6 is a vertical sectional view taken through the pin bar holder as viewed on line 6—6 of FIG. 5, FIG. 7 is a vertical sectional view of the batcher looking upon rear of the cutter bar assembly and the spring pressed starting fingers for starting the sheet material upon the new roll as viewed on line 7—7 of FIG. 4, FIG. 8 is a vertical sectional view of the batcher looking upon the hold down pin bar assembly as viewed upon line 8—8 of FIG. 4, the pin bar being constructed according to a modified form of the invention, FIG. 9 is a fragmentary perspective view of the modified pin bar, and FIG. 10 is an enlarged sectional view of the pin bar as viewed on line 10—10 of FIG. 9.

Referring now to the figures, 15 and 16 respectively represent spaced side supports formed of sheet stock pieces welded together. These supports respectively have foot pieces 17 and 18 by which the batcher can be secured to the floor. Parallel round tie rods 20 and 21 extend between the side supports to hold them in spaced relationship at their lower ends and they are made secure thereto by fastening bolts 23 and 24 on the side supports. Also extending between the bottom of the supports and secured to the foot pieces 17 and 18 are parallel angle iron runners 25 and 26 and to the undersides of which are connected fore and aft running foot pieces 27 and 28 adapted to be secured to the floor and on which is supported a base 29 having an upstanding portion 30 from which there extends a bracket 31 that has connected to it a two-way elevating cylinder 32 that is supplied by an air pipe 33 at its lower end and to its upper end by a pipe 34. A valve 35 is provided on the lower end of the cylinder 32 and is operated from a bleeder line 36 having a press button control 37 located upon the upper part of the side support 16 and easily available to the operator of the batcher.

The cylinder 32 elevates a cutter bar assembly indicated generally at 37 in FIG. 7. The cylinder 32 has a piston rod 38 that is connected with a block 39 in the underside of the cutter bar assembly 37 at the middle thereof. This cutter bar assembly comprises a transversely-extending upper frame member 41 of hollow square section and tilted to have two top faces. A jagged knife blade 42 is secured to the front one of the upper faces of the upper frame member 41 by fastening bolts 43, FIG. 5, and is inclined upwardly from the front of the batcher to the rear so as to separate the roll of textile, plastic or paper 40 that has been batched as shown in FIG. 4 and in the manner to be later described in detail. A lower frame member 44 is disposed below the frame member 41 and is likewise formed of a square section hollow tubular member. The ends of these frame members 41 and 44 are bolted to vertically-extending slides 45 and 46 and are made further rigid therewith by internal gusset plates 47 and 48, FIG. 7. On the side support 15 are vertically-spaced guide brackets 49 grooved in their ends to guide the vertically-extending slide 45. The side support 16 has grooved vertically-spaced inwardly-extending guide brackets 50 for the vertically-extending slide 46. An inclined web 51 extends across the cutter bar assembly 37 and is welded to the upper and lower frame members 41 and 44. Extending rearwardly from the web and just above the frame member 44 are a series of longitudinally-spaced lugs 52 through which extend a pivot rod 53 on which are mounted a plurality of roll starting fingers 54 that are respectively biased rearwardly from the cutter bar assembly 37 by respective coil springs 55 carried by the pivot rod 53 and each of said springs having one end anchored against the web 51 and the other end lying under the finger 54. These fingers 54 are extended as the cut is made to take the end of the sheet material 40 and wrap it around a wood roll 56. As the cutter bar assembly 37 is retracted, these sets of fingers ride over the transversely-extending guide plate 57 secured by fastening bolts 58 between the upper cutter bar guide brackets 49 and 50 on the side supports 15 and 16, FIG. 7. The upper portion of the guide plate 57 is bent rearwardly to locate the fingers under the new roll 56 as the cutter bar assembly 37 is elevated. The fingers, of course, cannot function unless a clean cut of the sheet material has been made and by the jagged blade 42 on the cutter bar assembly 37. Tenting of the sheet material often results as the cutter bar is lifted and prevents a good cut from being made.

According to the present invention, there has been provided a removable hold down pin bar 60 that is disposed over the sheet material 40 after its batched roll thereof has been brought forwardly, FIG. 4. This pin bar has a series of sharp inclined pins 61 that penetrate the sheet material 40 as the cutter bar assembly 37 lifts the material from the underside thereof and prevents the material from pulling away or tenting, thereby ensuring a clean cut. The hold down pin bar 60 is thereafter removed until another batched roll of the sheet material is to be taken from the batcher.

On the side supports 15 and 16, are bearing bosses 63 and 64 between which there extends a pin bar holder rod 65 having square ends 66 and 67 respectively and into which there extend bolts 68 and 69 on which the rod 65 pivots, FIGS. 5, 6 and 8. The left side of the batcher has an angle bracket 70 welded to the squared end 66 and this bracket has an arcuate slot 71 on the part that lies flush against the inner face of the end support 15. A bolt 72 is extended through the slot 71 and after the pin bar holder rod 65 has been tilted to the desired angle, the bolt 72 is tightened so as to hold the bar in its adjusted position.

Secured to the squared ends 66 and 67 of the rod 65 so as to extend upwardly therefrom, are the pin bar holders 74 and 75 into which the ends of the pin bar assembly 60 can be slid and supported. These pin bar holders 74 and 75 are respectively secured to the rod ends by respective fastening bolts 76 and 77. The pin bar holder 74 or 75 has a rearwardly-extending slot 78 with an upwardly and rearwardly-extending extending slide or guide surface 79 against which the end of the pin bar is placed to guide the end of the pin bar into the slot 78. The outerside of the holder 74 or 75 is closed by a vertical wall 80 that leads to a bottom shelf portion 81 from the guide surface 79 and a top portion 82 holds down the pin bar. Each of the holders 74 and 75 has a hole 85 at the base of the guide surface 79, FIG. 6, into which one leg of a U-shaped pin 83 or 84 is extended to lock the end of the pin bar 60 is place, in the slots 78 of the holders and to prevent the same from riding upwardly over the inclined guide surfaces 79, and out of the slots 78. The U-shaped pins 83 and 84 are prevented from becoming lost by respective chains 86 and 87 secured respectively to the holders by the respective fastening bolts 76 and 77.

The end supports 15 and 16 have respectively bearing assemblies 100 and 101 in which is journalled a shaft 103 of a first drive roller 104, FIG. 5. On the shaft 103, there is connected a sprocket 104', FIG. 1, which is driven from a chain 105 that is connected either to a machine from which the sheet material is being batched or to a power drive synchronized therewith.

At the front of the batcher and mounted respectively on end supports 15 and 16 are respective bearing assemblies 107 and 108, FIG. 1, in which is journalled a shaft 109 of a second drive roller 112 that is slightly larger in diameter than the first drive roller 104. On the first shaft 103 is a sprocket 113, FIG. 3, that is connected by a chain 114 to a sprocket 115 on the shaft 109 of the second drive roller 112.

These sprockets 104' and 115 are enclosed by a housing 116 connected to the end support 16 by brackets 117, FIG. 1. Both driver rollers 104 and 112 are driven in the same direction so that the textile or other sheet material being wound upon the wood batching roll 56 is driven to batch up the roll, first with the drive roller 104 then with the drive roller 112 when the wood batching roll and its contents has been shifted thereto whereby to keep it in continuous operation until filled and ready to be severed from the run of the sheet material 40.

On the inner side of the end frame 15, there is mounted a batching roll-supporting assembly 120 for vertical adjustment thereon. This assembly has a runner support 121 with a dropped end 122 on which one end pin 56' of the wood roll 56 is placed, FIGS. 1 and 5. As the wood roll builds up with the sheet material the end pin 56' will clear a shoulder 123 on the support 121 and be extended into notch 124 of a pusher slide 125 and against small rollers 126 thereon. The slide is supported in upper and lower guides 127 and 128 and is operated by a two-way cylinder device 129 mounted upon the upper guide 127 and receives air under pressure from a pipe line 130.

At the opposite side of the machine and mounted upon the end support 16 for vertical adjustment is a batching roll-supporting assembly 140 that has a depending portion 141 which is adjustable in vertical guideways 142 and 143, FIGS. 3 and 4. This assembly 140 has rearwardly-extending horizontal portion 144 with upper and lower guideways 145 and 146 in which a slide 147 is operated. The slide 147 has a depending portion 148 with a plate 149 thereon that has a notch 150 with rollers 151 thereabove, corresponding to the notch 124 and rollers 126 of the opposite assembly 120 for receiving end extension 56' of the wood roll 56. The slides 125 and 147 are movable between a dotted line starting position indicated at 149' and a full line position, FIG. 4, so as to push the batched wood roll over a runner 152 from its dropped end 153 to a discharging position. A cylinder 154 is mounted on top guide way 145 and which has a piston rod 155 that is connected to a bracket 156 fixed to the rear end of the slide 147.

The lower end of the depending portion 141 of the frame as shown in FIG. 3 has a rack bar 158 in mesh with which is a pinion gear 159 secured to a shaft 161 that extends the full width of the batcher which will have a corresponding pinion gear at the other side that operates a corresponding rack on the opposite assembly 120, neither part being shown, FIG. 3. On the same shaft 161 adjacent to the pinion gear 159 and on the outer side of the side support 16, is a sprocket 162 that is connected by a vertically-extending chain 163 to a sprocket 164 fixed to a stub shaft 165 that is mounted in a bearing 166 on the upper end of the side support 16. This stub shaft 165 is manually turned by a hand knob device 167 with radially extending handles 168 and on which a hand brake device 169 is mounted and turned by its handles 170. Fixed to the shaft 165 is a ratchet 171 against which a ratchet lever 172 having hand knob 173 extends and is retained thereagainst by an over center biasing device 174. By turning the hand knob device 167 in clockwise direction as viewed in FIG. 1, the batching roll-supporting assemblies 120 and 140 on the opposite ends of the batcher are elevated. With the ratchet lever 172 in its operative position, the batching roll of sheet material will be held against downward displacement yet permitting its hand elevation. Without the ratchet lever 172, free elevation is permitted. The brake device 169 can be adjusted to resist the upward movement of the batching wood roll and its contents as the sheet material builds up thereon and to give a desired tightness to the sheet upon the roll.

To assist in the lifting of the batching roll, there is provided a large counterweight 175 at the rear of the batcher. This counterweight is connected by side extensions 176 and 177 respectively to pulley cables 178 and 179 extending through the ends thereof and respectively over pulleys 180 and 181 fixed to a transversely-extending shaft 182 journalled between the side frames 15 and 16. The slides 125 and 147 are caused to move together by an equalizing shaft 185 that has its ends journalled between the batching roll-supporting assemblies 120 and 140. This shaft 185 has pinion gears 186 and 187 adjacent the respective assemblies 120 and 140 and the slides 125 and 147 respectively have gear rack extensions 188 and 189 that mesh with the respective gears 186 and 187. The cylinder devices 129 and 154 through the equalizing shaft 185 will thus cause the slides 125 and 147 to be operated in unison to transfer the batched roll from the drive roller 104 to the drive roller 112.

With the wood roll 56 in place on the drop ends 122 and 153 of the respective inclined runners 121 and 152, the sheet material is started on the wood roll 56. The sheet material 40 passes over the first drive roll 104 and is lifted by the fingers 54 and started upon the wood roll 56. A hold down device 190 is lowered onto the started roll and left until the roll has been built up to some extent. This device 190 has a shaft 191 that is journalled between end bearing brackets 192 and 193 on the end supports 15 and 16 and a handle 194 for lowering and lifting spaced arms 195 on the outer ends of which are respective double roller elements 196 for engaging the sheet material, FIGS. 1 and 2. As the roll builds up, its ends 56' are directed into the notches 124 and 150 and as the roll builds up further the assemblies 120 and 140 are lifted against the action of the brake 169.

When the batching roll 56 has been built up to the desired size, a trip valve 198 is tripped by a pin 199 on a vertically-adjustable trip bracket 200 secured to the end support 16. The batched roll is automatically transferred by the slides 125 and 147 to the drive roll 112, FIG. 4. The ends 56' of the roll 56 will roll forwardly down the runners 121 and 152. As the assemblies 120 and 140 are lowered, the pin 201 of the bracket 200 will trip the trip valve 202 so as to cause the cylinder devices 129 and 154 to return slides 125 and 127 to their original positions. The pipe line 130 extends to the cylinders 129 and 154 and a control air hose 203 supported thereon extends between the cylinder devices 129 and 154 for the trip valves 198 and 202.

The batched roll 56 is received by vertically-swingable arms 205 and 206 opposing one another and respectively pivotally connected by pivot pins 207 and 208 on the respective end supports 15 and 16, FIG. 1. The arm 205 has two rollers 209 by which one end extension 56' of the wood roll 56 is caught. The end of the wood roll having been guided by a forwardly and downwardly curved guide portion 210 on the upper edge of the arm 205.

The arm 206 has a corresponding curved guide portion 213 so as to guide the other end extension 56' on the wood roll 56 and at the lower end of the arm is a fixed roll 214 and a releasable roll 215 adapted to be retracted by operating latch 216, FIG. 3. As the batched roll is thus discharged from the batcher and dropped to the floor, rubber blocks 217 and 218 on the respective end supports 15 and 16 will cushion the fall of the respective arms 205 and 206.

Before discharging the batched roll, a new roll 56 will have been put in place upon the dropped ends 122 and 153 of the respective runners 121 and 152, the first drive roll 104 having been batched and transferred to the second drive roller 112. The operator of the batcher will have lifted the pin bar 60 by its handles 60c and 60d over the batched roll and placed it upon the pin bar holders 74 and 75 so its ends are located in the slots 78 thereof and with the pins 61 inclined downwardly and forwardly to overlie the sheet material 40 now being driven by the drive roll 112.

The pin bar pins 61 are inclined in the same direction as the cutting knife 42 and downwardly toward the drive roller 112. The U-shaped latch pins 83 and 84 will have been put in place so that they positively lock the pin bar to the holders.

The bleeder valve 37 is depressed so that the cutter bar assembly 37 is elevated, its cutting knife 42 severs the sheet material 40 without difficulty as best illustrated in FIG. 4 and while the drive rollers 104 and 112 continue to rotate. The starting fingers 54 will ride upwardly on the guide plate 57 and will engage the cut end of the sheet material 40 and wrap it around a new wood roll 56 which had been put in place between the runners 121 and 157. The wood roll 56 will be driven all the while by the first drive roller 104. The second drive roller 112 will continue to drive the batched roll 56 to wind up the remaining end thereof. With the new roll already having been started the latch lever 216 on the swing arm 206 can be lifted to discharge the batched roll to the floor. The cutter bar assembly 37 will have been returned immediately after having started the next wood roll. With the batch roll already discharged, the latch pins 83 and 84 are removed and the pin bar 60 is lifted out of its holders. The new wood roll is continued to be batched by the drive roller 104. When the roll 56 is batched it is shifted forwardly to be driven by the second drive roller 112 and the pin bar 60 is then reinserted in its holders preparatory to the next cutting operation. The sheet material 40 is thus again held down so that again the sheet material is prevented from tenting and a clean cut is thereby effected. The pins 61 are so inclined that the end of the severed batched roll is easily separated from the pins. Tenting of the sheet material will have been prevented by the pin bar. Because of the pins 61 holding the material the severing can be perfectly effected even in the absence of back tension on the cloth from the machine which the batcher is serving.

In FIGS. 1 to 7, the pin bar which has been shown has been formed of a single hollowed square section bar of sufficient length to span the batcher and to have its ends lie in the pin bar holders. The pins 61 are secured in pin retaining plates 61', FIG. 5, that are in turn secured to the underface of the square section bar 60' by bolts 61'' that extend downwardly through the bar from the top and threaded into the pin retaining plates 61'. These pin retaining plates 61', extend substantially the full length of the underside of the bar 60' except up to a small extent on the ends of the bar which can fit into the slot 78 of the holders 74 and 75. In order that the pin bar 60 will be inserted properly so that the pins 61 extend in the proper direction one end of the bar may be painted with a color, and the corresponding holder made of a similar color so that the bar can thus be polarized with the holders.

In FIGS. 8, 9, and 10, there is shown a modified form of the pin bar and one which is reinforced throughout its length to prevent it from sagging under its weight when mounted between the pin bar holders. This pin bar assembly is generally identified at 60a. It has a square hollow bar 60a' with pin retaining plates 61a' and inclined pins 61a that are inclined in the same direction from the underside of the pin bar 60a as are the pins 61 of the pin bar 60. A channel shaped reinforcing member 60a is mounted over the top of the bar and is secured thereto by laterally-extending bolts 60b secured between the legs of the member by nuts 60b' and by vertically-extending bolts 61a'' and certain of which extend through and secure handles 60c' or 60d' to the bar assembly. Likewise the ends of this bar assembly can be painted a different color to make certain that it is properly inserted in the holders.

It should now be apparent that there has been provided a hold down pin bar for use with continuous batchers whereby a positive cut of the sheet material will be insured even with a standard type cutting knife assembly and without the need for the cutting disc type cutting bar assembly, so often used with batchers but difficult with threaded material as the threads become entangled with the individual cutting discs and the cutting bar is difficult to keep clean. The present hold down pin bar has made possible the clean cutting of material of substantially any thickness or texture with but a standard straight cutting knife blade.

While various changes may be made in the detail construction, it shall be understood that such changes shall be within the spirit and scope of the present invention as defined by the appended claims.

What is claimed is:

1. In a continuous batcher for cloth, plastic or paper sheet material having end supports and two longitudinally-spaced drive rollers for driving the sheet material journalled between the end supports, a power operated cutting assembly including a transversely-extending cutting knife mounted between said rollers and vertically movable upwardly through the space between the drive rollers to sever the sheet material, opposing pin bar holders respectively mounted upon the end supports at the end of the space between the drive rollers and above the cutting knife, and a hold down pin bar removably supported upon the pin bar holders to extend between the drive rollers immediately adjacent thereto and above the sheet material so as to be engaged by the sheet material as the cutting knife is vertically moved upwardly to sever the sheet material, said removable hold down pin bar having a series of pin-like projections running along the underside of the pin bar for penetrating the sheet material, whereby the sheet material passes between the cutting knife and the pin bar prior to the actuation of the cutting knife and will be forced into engagement with the pin-like projections of the hold down pin bar by the cutting knife upon the upward vertical movement thereto.

2. In a continuous batcher for cloth, plastic or paper sheet material as defined in claim 1, and said opposing pin bar holders having laterally-extending open slots to respectively receive the ends of the pin bar in a drop slidably fitted manner.

3. In a continuous batcher for cloth, plastic or paper sheet material as defined in claim 2, and latch members respectively associated with the respective pin bar holders for positively securing the ends of the pin bar within said laterally-extending open slots against outward displacement therefrom.

4. In a continuous batcher for cloth, plastic or paper sheet material as defined in claim 2, and a rod pivotally connected between said end supports and said pin bar holders being fixed to said rod for fore and aft movement thereby and arm means extending outwardly from one end of the pivot rod to be pivoted therewith and means for securing said arm means to one end support to retain the pivot rod and the pin rod holders in their pivotally adjusted positions.

5. In a continuous batcher for cloth, plastic or paper sheet material as defined in claim 2, and said hold down pin bar having a plate containing the series of pin-like projections removably secured to the underface of the pin bar, said pin-like projections extending from said pin retaining plate inclined to the undersurface thereof and inclined to the sheet material to permit after severance of the sheet material the easy slipping and release of the sheet material from the pin projections and the hold down pin bar.

6. In a continuous batcher for cloth, plastic or paper sheet material as defined in claim 2, and a reinforcing inverted channel-like member fitted over the pin bar and free of the underface thereof, and fastening elements extending through the legs of the channel-like member and the sides of the pin bar to secure the reinforcing channel member thereto, said reinforcing channel member extending along substantially the entire length of the hold down pin bar leaving only the ends of the bar free for slide fitting the bar ends into the holder slots.

References Cited in the file of this patent

UNITED STATES PATENTS

| | | |
|---|---|---|
| 1,256,659 | Cameron et al. | Feb. 19, 1918 |
| 1,979,334 | Lyth | Nov. 6, 1934 |
| 2,364,888 | Aycock | Dec. 12, 1944 |
| 2,537,588 | Husson | Jan. 9, 1951 |
| 2,676,764 | Aulen | Apr. 27, 1954 |